May 8, 1945. T. H. SARCHET 2,375,443
DECELERATING MEANS
Filed Nov. 26, 1943 2 Sheets-Sheet 1
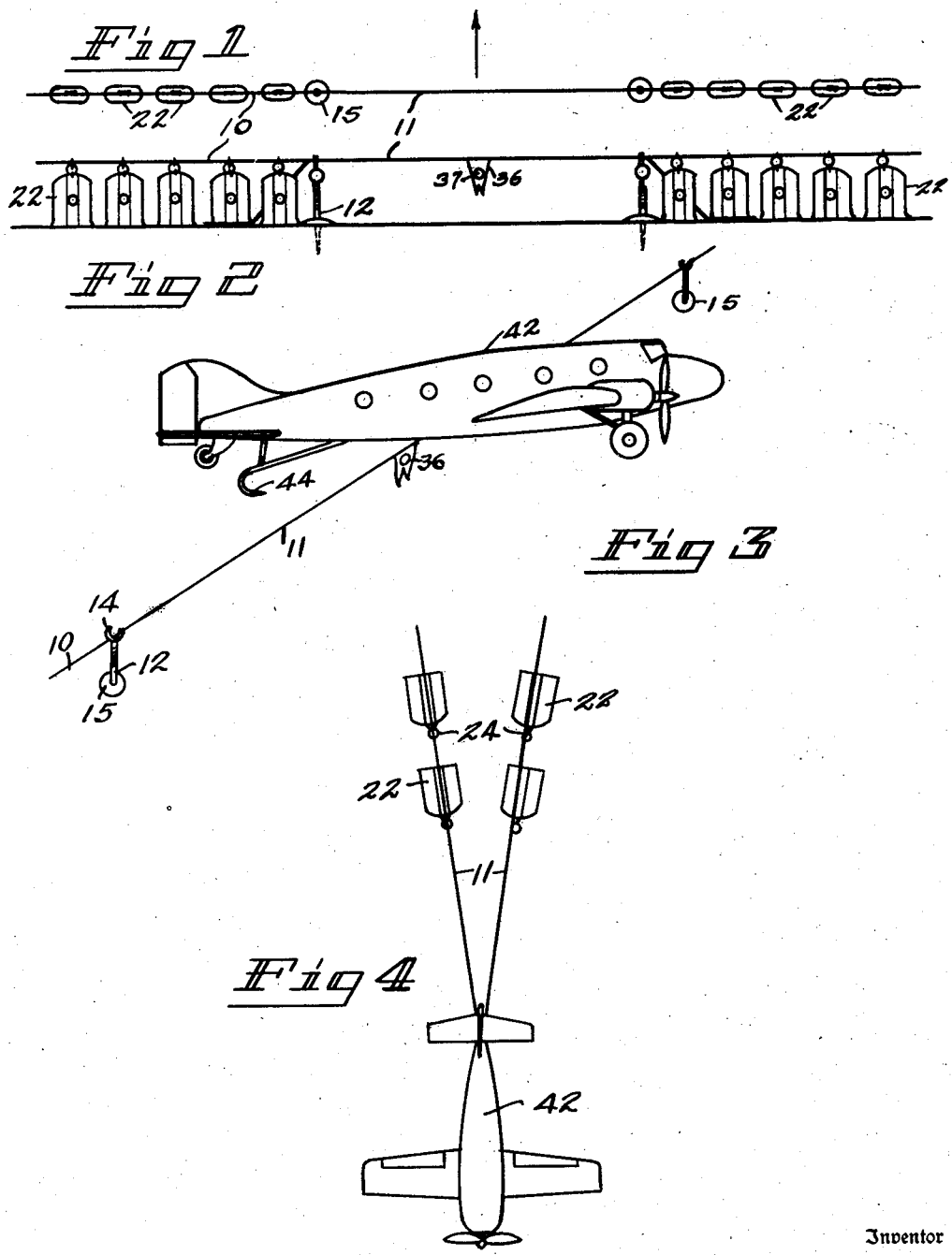
Inventor
THOMAS H SARCHET
By Herbert E. Smith
Attorney May 8, 1945. T. H. SARCHET 2,375,443
DECELERATING MEANS
Filed Nov. 26, 1943 2 Sheets-Sheet 2
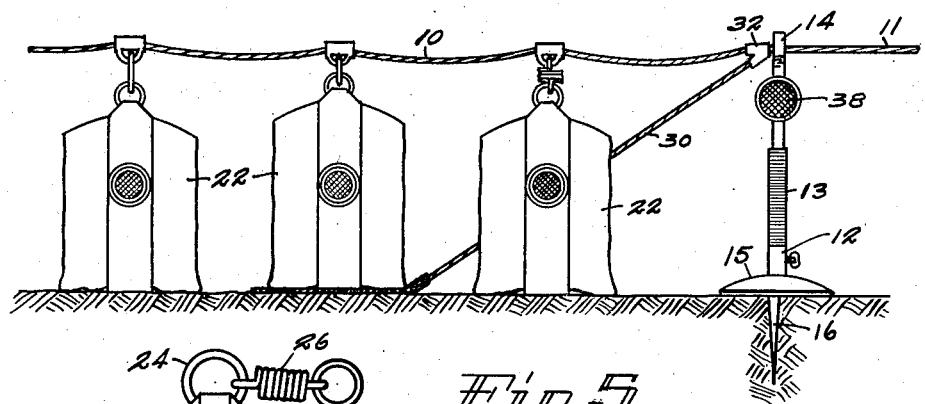
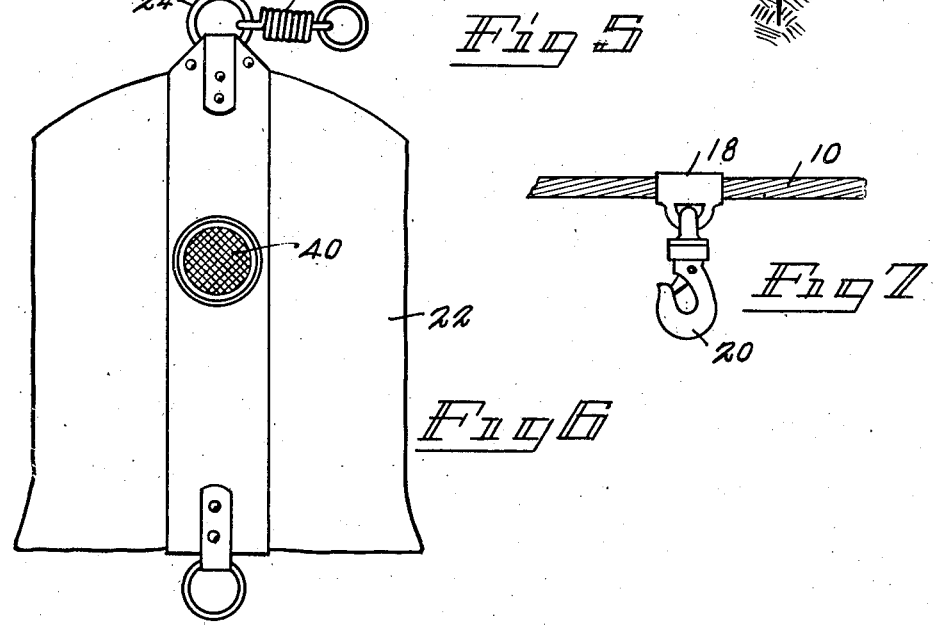
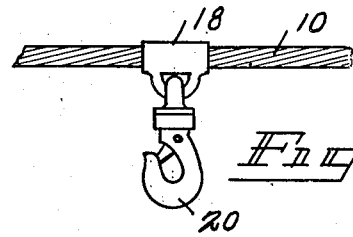
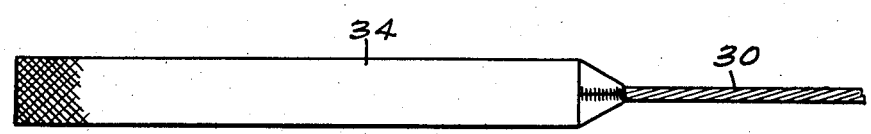
Inventor
THOMAS H. SARCHET
By Herbert E. Smith
Attorney Patented May 8, 1945

2,375,443

UNITED STATES PATENT OFFICE 2,375,443

DECELERATING MEANS

Thomas H. Sarchet, Spokane, Wash.

Application November 26, 1943, Serial No. 511,801

1 Claim. (Cl. 244—110)

This invention relates to improvements in decelerating means and, more particularly, to means for decelerating aircraft while a landing is being made.

It is well known that there are many occasions where aircraft is required to land in ground space that is inadequate to accommodate the landing craft due to its speed, normal runway requirements or other conditions that are not met by the facilities available. It is also well known that mechanical means have been installed on aircraft carriers to be engaged by the incoming aircraft and to serve to bring the same to a halt in forward flight within a limited area. While such means are available for installation in such a precise structure as an aircraft carrier, they do not lend themselves to economical installation in the many emergency landing fields throughout the world since the devices are usually very complicated, require constant skilled servicing and represent large initial investment not compatible with the limited use of which they may be made.

Having in mind the defects of the prior art, it is an important object of this invention to provide a decelerating mechanism for aircraft that is not complicated in construction or operation and which may be produced and used at low cost.

Another object of the invention is the provision, in an aircraft deceleration mechanism, of sequentially operable forces to be applied periodically to an aircraft to smoothly decelerate the same gradually and without applying undue forces in a destructive manner.

A further object of the invention resides in providing, in aircraft decelerating means, a hook engaging member that is releasably supported adjacent the path of an aircraft and is coupled to weights that are sequentially effective upon the same to smoothly counteract the force of the incoming aircraft without placing undue strains thereon.

The foregoing objects and others ancillary thereto I prefer to accomplish as follows:

According to a preferred embodiment of my invention, I dispose adjacent the path of an incoming aircraft to land a weighted cable to be engaged by a hook on the aircraft. Specifically the cable is disposed transversely of the path of such aircraft and is supported slightly above the ground in a releasable manner to be hooked by and to trail after the aircraft as it progresses toward its landing. This cable is supported by flexible standards having forks from which the cable is easily dislodged when drawn therefrom by the aircraft. To the cable in spaced apart relation on either side I attach weighted containers which sequentially become effective in applying decelerating force upon the aircraft through the instrumentality of the cable. A specific form of my weighted containers, and one that I find simple to produce and maintain in operation, is heavy canvas bags filled with sand and having ring means whereby either flexible or nonflexible couplers may secure the bag to the cable.

The novel features that I consider characteristic of my invention are set forth with particularity in the appended claim. The invention itself, however, both as to its organization and its method of operation, together with additional objects and advantages thereof, will best be understood from the following description of a specific embodiment when read in connection with the accompanying drawings, in which Figure 1 is a plan view of my aircraft decelerating means, Figure 2 is a view in elevation of the mechanism of Figure 1, Figure 3 is a view in perspective of an airplane shown in a manner suggesting its engagement with my decelerating mechanism, Figure 4 is a view of an aircraft as it appears in plan when being decelerated by my invention, Figure 5 is an enlarged view of a portion of my aircraft decelerating mechanism, Figure 6 shows in enlargement a specific form of a weighted container used in connection with my invention, Figure 7 is an enlarged detail view of a coupler used between the weights and the cable of my decelerating apparatus, and Figure 8 illustrates the anchor end of a brace member employed in connection with my invention.

Aircraft decelerating mechanism to overcome the defects hereinbefore enumerated must have at least two totally distinct characteristics; it must be capable of simple construction and operation under conditions of hard usage; and it must also provide resilient but definitely decelerative forces upon an aircraft without injuring the same. Thus, a preferred embodiment of my invention, referring to the figures of the drawings, is constituted by a cable along the length of which on opposite points from a mid portion is secured weighted bags to apply a resilient braking effect. A cable 10 is disposed transversely of a landing strip and, at least in its mid-portion, is supported above the ground surface by standards 12, 12 which have upper forks 14, 14 to hold the cable. In Figure 5 the standard 12 has a spring section 13 which permits the upper portion of the standard to flex relative the lower portion which is releasably anchored to the ground by its base 15 and the spike 16.

Anchored to the cable 10 on either side of supported mid section are series of clips 18 which have swivel hooks 20 to each of which may be attached a weighted bag 22 directly by means of the ring 24 or, as shown in Figure 6, by means of the intermediate spring link 26. These bags are set on the ground along the outward extending ends of the cable in spaced apart manner as can be seen in Figures 1 and 2.

As an aid in maintaining the mid section 11 of the cable taut between the standards 12, 12, I employ the braces 30 which are secured to the main portion of the cable 10 by clips 32. The free end of each brace 30 preferably has a tape 34 which, as shown in Figure 5, may be held to the ground by one of the outer weighted bags whereby the mid section may be drawn taut and then secured in taut condition by the brace members.

A target flag 36 having a reflector button 37 of well known light reflecting characteristics may be attached in the mid portion 11 of the cable to aid in designating for an incoming aviator the location of the cable. Similar reflector buttons 38 are shown on the standards 12 and on the bags 22 where they are designated by the numeral 40.

When the apparatus is set up on a landing field as suggested in Figure 3, the aircraft 42 provided with a hook 44 may come in for a landing in the usual manner. The pilot flies the craft so that the hook 44 engages under portion 11 of the cable. Of course the aircraft will proceed forward beyond the cable location and, in doing so, will dislodge the cable from the forks 14 of the supports and cause the cable to trail in the manner suggested in Figure 4. In such case, the bags 22 that are located immediately outside the supports are drawn forward and apply their weight through the cable to the aircraft. Sequentially others of the bags are likewise drawn forward to gradually increase the load on the cable and to gradually decelerate the aircraft until it is brought to a stop. It is important to observe that the decelerating weight of the entire group of bags is not applied to the cable at once in its entirety but applies as a gradually increasing load to bring the aircraft to rest without forward flight all within a considerably shorter distance than would otherwise be possible without my decelerating mechanism.

Having thus described my invention, I claim:

Decelerating mechanism for aircraft having hook means in trailing relation therebelow, said mechanism comprising: a cable disposed transversely of the line of flight of such aircraft to be engaged by its hook, a standard adjacent said cable at each side of said line of flight, each standard having a fork for releasably supporting said cable, weighted bags attached to each cable end externally of the supporting standards and in spaced apart relation therealong, and a brace cable attached to each end of the mid portion and extending outwardly to be secured by one of said weighted members in a manner to make taut the mid portion of the cable.

THOMAS H. SARCHET.